United States Patent

Zaidi et al.

[11] Patent Number: 5,954,814
[45] Date of Patent: Sep. 21, 1999

[54] SYSTEM FOR USING A BRANCH PREDICTION UNIT TO ACHIEVE SERIALIZATION BY FORCING A BRANCH MISPREDICTION TO FLUSH A PIPELINE

[75] Inventors: Nazar A. Zaidi, San Jose; Deepak J. Aatresh, Sunnyvale; Michael J. Morrison, Santa Clara, all of Calif.

[73] Assignee: Intel Corporation, Santa Clara, Calif.

[21] Appl. No.: 08/994,400

[22] Filed: Dec. 19, 1997

[51] Int. Cl.⁶ .................................................. G06F 9/312
[52] U.S. Cl. .............................. 712/227; 712/23; 712/43; 712/240; 712/239; 712/229
[58] Field of Search .............................. 712/239, 23, 43, 712/240, 227, 229

[56] References Cited

U.S. PATENT DOCUMENTS

| | | | |
|---|---|---|---|
| 5,136,696 | 8/1992 | Beckwith et al. | 712/240 |
| 5,136,697 | 8/1992 | Johnson | 712/239 |
| 5,377,336 | 12/1994 | Eickemeyer et al. | 712/207 |
| 5,553,253 | 9/1996 | Pan et al. | 712/240 |

FOREIGN PATENT DOCUMENTS 409237221  9/1997  Japan .

Primary Examiner—Thomas C. Lee
Assistant Examiner—Jacob F. Hart
Attorney, Agent, or Firm—Blakely, Sokoloff, Taylor & Zafman

[57] ABSTRACT

A microprocessor includes an instruction fetch unit, a branch prediction unit, and a decode unit. The instruction fetch unit is adapted to retrieve a plurality of program instructions. The program instructions include serialization initiating instructions and branch instructions. The branch prediction unit is adapted to generate branch predictions for the branch instructions, direct the instruction fetch unit to retrieve the program instructions in an order corresponding to the branch predictions, and redirect the instruction fetch unit based on a branch misprediction. The branch prediction unit is further adapted to store a redirect address corresponding to the branch misprediction. The decode unit is adapted to decode the program instructions into microcode. The microcode for each of the serialization initiating instructions includes microcode for writing a serialization address of the program instruction following the serialization initiating instruction in the branch prediction unit as the redirect address and triggering the branch misprediction.

12 Claims, 2 Drawing Sheets

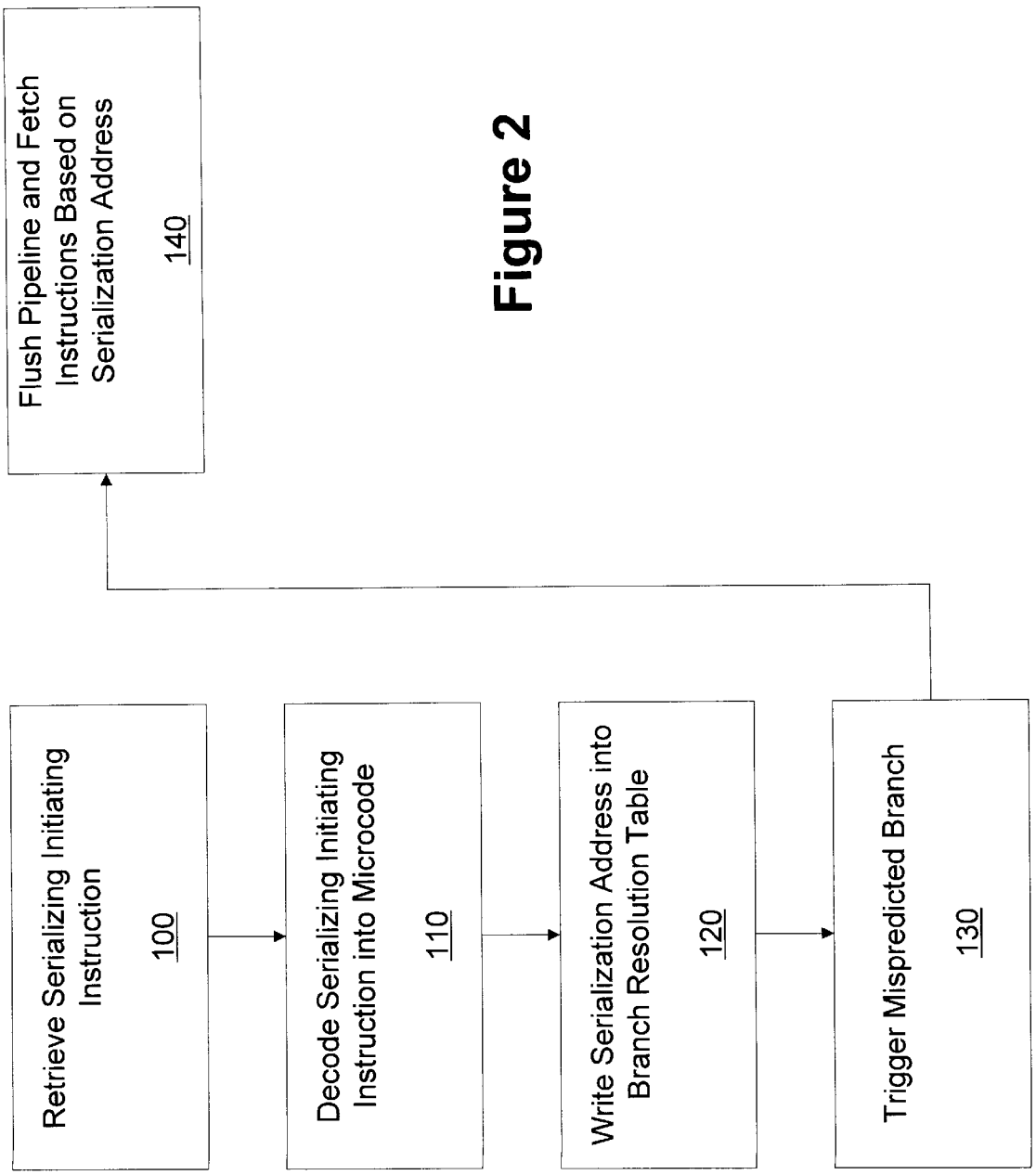

SYSTEM FOR USING A BRANCH PREDICTION UNIT TO ACHIEVE SERIALIZATION BY FORCING A BRANCH MISPREDICTION TO FLUSH A PIPELINE

BACKGROUND OF THE INVENTION

1. Field of the Invention

This invention relates generally to controlling the flow of program instructions in a microprocessor, and more particularly, to serializing the flow of program instructions in a microprocessor using branch instructions.

2. Description of the Related Art

A microprocessor typically operates in different states or modes. For example, a microprocessor may operate in both a protected mode and an unprotected mode. The microprocessor may operate in either a 16-bit execution mode or a 32-bit execution mode. Also, certain instructions, such as a far call instruction, may change the code segment of the instructions the microprocessor is executing. Hereinafter, such events, and other like events, are referred to as serialization events. More generally, a serialization event is defined as any event for which it is desirable to serialize the machine before continuing execution.

After a serialization event, it is desirable to flush the pipeline and update the state before continuing execution. Because certain instructions are executed by the microprocessor out-of-order, it is first necessary to let the instructions prior to the serializing event finish executing. A known method to serialize a microprocessor is to issue a serializing micro-instruction. Hardware in the microprocessor must recognize the serialization micro-instruction and stall the pipeline at the correct point until the state can be updated. In some cases, when instruction restart is necessary, an explicit command to fetch the next instruction must be issued. Serialization using this method requires that special serializing micro-instructions be added to the instruction set, and that hardware in the microprocessor be adapted to recognize these special instructions.

The present invention is directed to overcoming, or at least reducing the effects of, one or more of the problems set forth above.

SUMMARY OF THE INVENTION

One aspect of the present invention is seen in a microprocessor including an instruction fetch unit, a branch prediction unit, and a decode unit. The instruction fetch unit is adapted to retrieve a plurality of program instructions. The program instructions include serialization initiating instructions and branch instructions. The branch prediction unit is adapted to generate branch predictions for the branch instructions, direct the instruction fetch unit to retrieve the program instructions in an order corresponding to the branch predictions, and redirect the instruction fetch unit based on a branch misprediction. The branch prediction unit is further adapted to store a redirect address corresponding to the branch misprediction. The decode unit is adapted to decode the program instructions into microcode. The microcode for each of the serialization initiating instructions includes microcode for writing a serialization address of the program instruction following the serialization initiating instruction in the branch prediction unit as the redirect address and triggering the branch misprediction.

Another aspect of the present invention is seen in a method for serializing program instructions in a microprocessor. The microprocessor includes a branch prediction unit. The method includes decoding a serialization initiating instruction. A serialization address is determined based on the program instruction to be executed by the microprocessor following the serialization initiating instruction. The serialization address is stored as a redirect address in the branch prediction unit. A branch misprediction is triggered in the branch prediction unit.

BRIEF DESCRIPTION OF THE DRAWINGS

Other objects and advantages of the invention will become apparent upon reading the following detailed description and upon reference to the drawings in which:

FIG. 2 is flow diagram of one embodiment of a method for serializing the microprocessor of FIG. 1.

Figure 1:
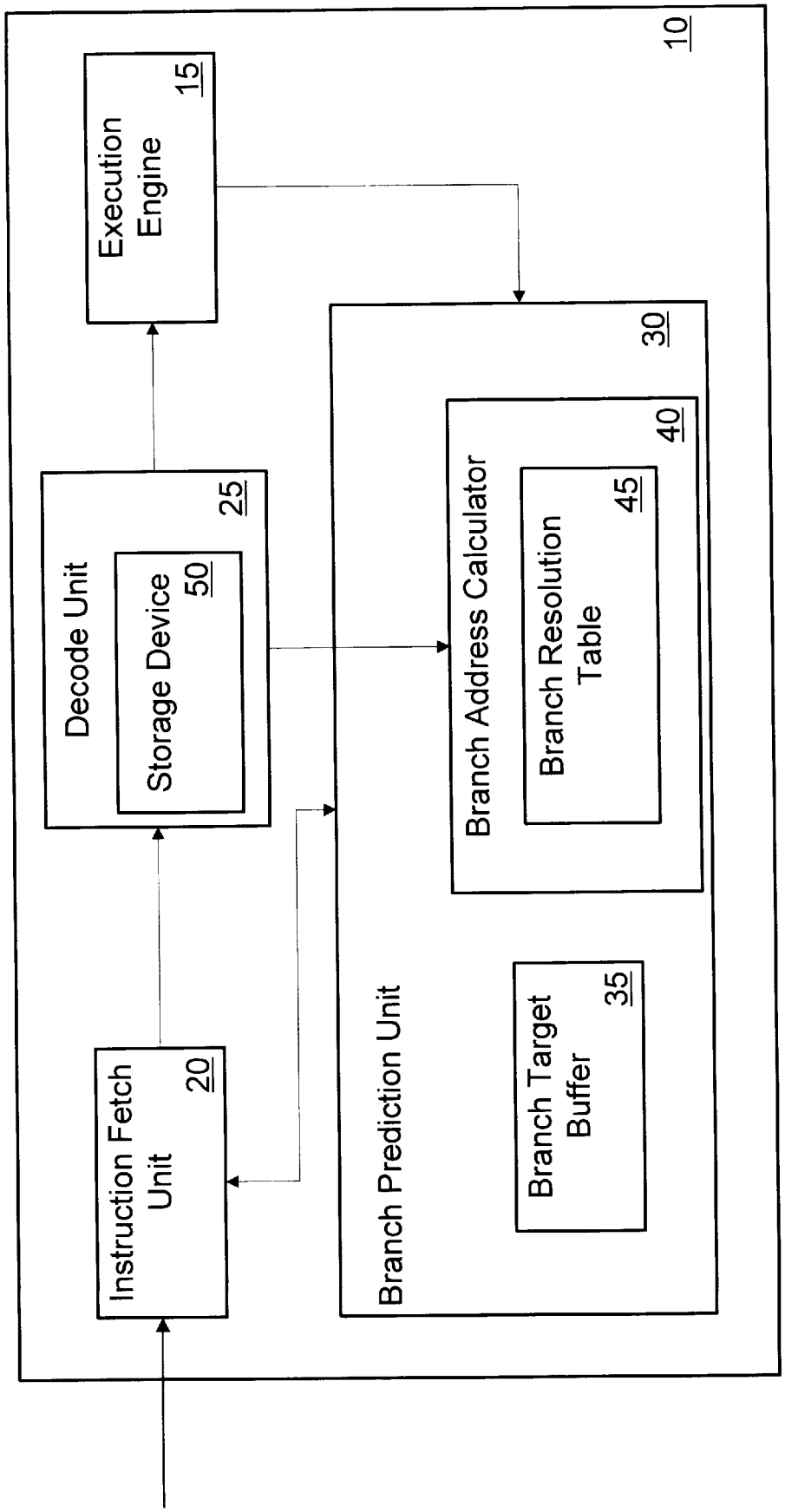
FIG. 1 is a block diagram of one embodiment of a microprocessor of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a microprocessor 10 of the invention is shown. The microprocessor 10 includes an execution engine 15, an instruction fetch unit 20, a decode unit 25, and a branch prediction unit 30. The instruction fetch unit 20 retrieves program instructions from a cache memory (not shown) or an external memory (not shown). The decode unit 25 decodes the program instructions into microcode for the execution engine 15 to execute. The branch prediction unit 30 determines the order in which the instruction fetch unit 20 retrieves the program instructions.

The branch prediction unit 30 includes a branch target buffer 35 and a branch address calculator 40. The branch target buffer 35 tracks the history of known branch instructions and predicts their outcome. The branch target buffer 35 can only track a branch instruction after it has been previously identified as a branch instruction. The first time the branch target buffer 35 encounters a branch instruction, it does not recognize it as such. The branch address calculator 40 receives decode information from the decode unit 25 about the stream of program instructions retrieved by the instruction fetch unit 20. For branches not identified by the branch target buffer 35, the branch address calculator 40 determines a static branch prediction and attempts to determine the target address of the branch instruction.

The goal of the branch prediction unit 30 is to identify and predict the outcome of branch instructions such that the instruction fetch unit 20 may retrieve the program instructions required by the execution engine 15 in advance. These fetched instructions can be decoded and ready for execution before the execution engine 15 needs them, thus enhancing the performance of the microprocessor 10. In the event that the outcome of a branch instruction was predicted incorrectly by the branch prediction unit 30, the address of the next instruction in the correct path must be determined for program execution to continue.

The branch address calculator 40 includes a branch resolution table 45 adapted to store the redirect address in the event that a mispredicted branch occurs. All branches detected by the branch address calculator 40 are allocated into the branch resolution table 45. After a mispredicted branch instruction, instructions entered into the pipeline subsequent to the mispredicted branch instruction are flushed, and the pipeline is reloaded from the redirect instruction address stored in the branch resolution table 45.

In the illustrated embodiment, the branch resolution table 45 is a circular first-in/first-out (FIFO) buffer with eight entries. The branch address calculator 40 maintains a head pointer for allocation into the branch resolution table 45 and a tail pointer for deallocation.

The use of a branch prediction unit 30 to enhance the efficiency of a microprocessor 10 is known in the art. The specific branch prediction algorithm used may vary. One such exemplary branch prediction unit is described in U.S. patent application Ser. No. 08/777,237, subject to assignment to the assignee of the present application, filed on Dec. 30, 1996, and entitled "Method And Apparatus For Branch Execution On A Multiple-Instruction-Set-Architecture Microprocessor," the entire disclosure of which is incorporated herein by reference.

A method for serializing the machine using the branch prediction unit 30 is described in reference to FIG. 2. An instruction initiating a serialization event (i.e., serialization initiating instruction) is retrieved by the instruction fetch unit 20 in block 100. The serialization initiating instruction is decoded into microcode in step 110. The microcode includes a statement (i.e., explicit write) to write the address of the next instruction to be executed after the serialization (i.e., serialization address) into the branch resolution table 45 at the location indicated by the head pointer (i.e., the current location). The same explicit write command is used to write the target of an indirect branch instruction from a register or memory into the branch resolution table 45 during the processing of the indirect branch. The explicit write is executed in block 120.

The microcode also includes a statement intended to trigger a mispredicted branch (i.e., mispredict trigger). The mispredict trigger is executed in block 130. For example, the mispredict trigger might be to check two equal values for an inequality. In the illustrated embodiment, the mispredict trigger includes checking for inequality in a comparison of the serialization address with itself. Because the serialization address will never be unequal with itself, the statement will always evaluate to false, thus resulting in a mispredicted branch condition.

After the mispredicted branch is triggered in block 130, the branch prediction unit 30 will signal the instruction fetch unit 20 of the mispredict condition in block 140. The branch prediction unit 30 will treat the intentionally triggered mispredicted branch as if it were an actual mispredicted branch. The serialization address will be provided from the branch resolution table 45 as the redirect address, and all instructions entering the pipeline subsequent to the misprediction will be flushed. The instruction fetch unit 20 will begin filling the pipeline from the serialization address.

In the illustrated embodiment, the statements for writing the serialization address and triggering the mispredicted branch are included in the microcode associated with the initiating instruction. For example, a far call instruction causes a code segment switch. Thus, it is desirable to serialize the machine prior to executing the target instruction of the far call. Because, it is known by construction that a serialization is desired, the microcode for the far call statement, which is typically stored in the decode unit 25 in a static storage device 50, includes the explicit write to the branch resolution table 45 and the mispredict trigger.

The static storage device 50 is typically a programmable logic array or micro-sequencer ROM adapted to provide a sequence of microcode instructions based on the program instruction being decoded. The microcode for all program instructions that initiate serialization events (e.g., mode switches, code segment switches, etc.) includes the explicit write to the branch resolution able 45 and mispredict trigger. Because the initiating instructions (i.e., instructions for which serialization is desired) are known, the static storage device 50 is programmed to affect the serialization. Thus, no dynamic detection of serialization events or insertion of serializing instructions is required.

Using the branch prediction unit 30 to trigger a mispredicted branch, in effect, serializes the machine without requiring specialized serialization instructions in the instruction set for the microprocessor 10. Also, because no special micro-ops are present, the hardware in the microprocessor 10 does not have to be adapted to recognize and react to the serialization instruction. Existing hardware (i.e., the branch prediction unit 30) is used to perform the serialization using the existing instructions for branch prediction and instruction fetching.

The structure of the branch prediction unit 30 is provided for illustrative purposes. As is known in the art, other constructions and storage devices for maintaining redirect addresses may be used in the branch prediction unit 30.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A microprocessor, comprising:
    an instruction fetch unit adapted to retrieve a plurality of program instructions, the program instructions including serialization initiating instructions and branch instructions;
    a branch prediction unit adapted to generate branch predictions for the branch instructions, direct the instruction fetch unit to retrieve the program instructions in an order corresponding to the branch predictions, and redirect the instruction fetch unit based on a branch misprediction, the branch prediction unit being further adapted to store a redirect address corresponding to the branch misprediction;

a decode unit adapted to decode the program instructions into microcode, the microcode for each of the serialization initiating instructions including microcode for writing a serialization address of the program instruction following the serialization initiating instruction in the branch prediction unit as the redirect address and triggering the branch misprediction.

2. The microprocessor of claim 1, wherein the branch prediction unit includes a branch resolution table adapted to store the redirect address.

3. The microprocessor of claim 1, wherein the decode unit includes a static storage device adapted to store the microcode associated with the serialization initiating instructions.

4. The microprocessor of claim 1, wherein the serialization initiating instruction comprises a far call instruction.

5. The microprocessor of claim 1, wherein the serialization initiating instruction comprises a mode change instruction.

6. A microprocessor, comprising:

means for retrieving a plurality of program instructions, the program instructions including serialization initiating instructions and branch instructions;

means for generating branch predictions for the branch instructions and directing the instruction fetch unit to retrieve the program instructions in an order corresponding to the branch predictions;

means for storing a redirect address;

means for redirecting the retrieving means based on a branch misprediction and the redirect address;

means for writing a serialization address of the program instruction following the serialization initiating instruction into the storing means as the redirect address; and means for triggering the branch misprediction.

7. A method for serializing program instructions in a microprocessor, the microprocessor including a branch prediction unit, the method comprising:

decoding a serialization initiating instruction;

determining a serialization address based on the program instruction to be executed by the microprocessor following the serialization initiating instruction;

storing the serialization address as a redirect address in the branch prediction unit; and triggering a branch misprediction in the branch prediction unit.

8. The method of claim 7, the branch prediction unit having a branch resolution table, the method further comprising storing the serialization address in the branch resolution table.

9. The method of claim 8, the branch resolution table including a plurality of entries, one of the entries being identified by a head pointer, wherein storing the serialization address includes storing the serialization address in the entry indicated by the head pointer.

10. The method of claim 7, further comprising executing the program instruction associated with the serialization address.

11. The method of claim 7, wherein triggering the branch misprediction includes comparing two equal values for inequality.

12. The method of claim 11, wherein the comparing includes comparing the serialization address with itself.

* * * * *

UNITED STATES PATENT AND TRADEMARK OFFICE
CERTIFICATE OF CORRECTION

PATENT NO.    : 5,954,814
DATED         : September 21, 1999
INVENTOR(S)   : Zaidi et al.

It is certified that error appears in the above-identified patent and that said Letters Patent is hereby corrected as shown below:

Column 4,
Line 22, delete "able" and insert -- table --.

Signed and Sealed this

Eighth Day of April, 2003

JAMES E. ROGAN
*Director of the United States Patent and Trademark Office*